(12) United States Patent
Brocious et al.

(10) Patent No.: US 7,010,490 B2
(45) Date of Patent: Mar. 7, 2006

(54) METHOD, SYSTEM, AND APPARATUS FOR LIMITING AVAILABLE SELECTIONS IN A SPEECH RECOGNITION SYSTEM

(75) Inventors: Larry A. Brocious, Apalachin, NY (US); Jonathan L. Gabel, Charlotte, NC (US); David C. Loose, Austin, TX (US); Ronald E. VanBuskirk, Louisville, CO (US); Huifang Wang, Sunnyvale, CA (US); Steven G. Woodward, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 767 days.

(21) Appl. No.: 09/770,577

(22) Filed: Jan. 26, 2001

(65) Prior Publication Data

US 2002/0103644 A1    Aug. 1, 2002

(51) Int. Cl.
*G10L 15/00*    (2006.01)
(52) U.S. Cl. .................................... 704/275
(58) Field of Classification Search ............... 704/251, 704/254, 270, 275
See application file for complete search history.

(56) References Cited

U.S. PATENT DOCUMENTS

| | | | | |
|---|---|---|---|---|
| 6,073,097 | A * | 6/2000 | Gould et al. ................. | 704/251 |
| 6,076,061 | A * | 6/2000 | Kawasaki et al. .......... | 704/270 |
| 6,112,174 | A * | 8/2000 | Wakisaka et al. ........... | 704/251 |
| 6,125,341 | A * | 9/2000 | Raud et al. .................... | 704/8 |
| 6,397,186 | B1 * | 5/2002 | Bush et al. ................. | 704/274 |
| 6,405,172 | B1 * | 6/2002 | Baker et al. ................ | 704/270 |
| 6,694,295 | B1 * | 2/2004 | Lindholm et al. .......... | 704/252 |

FOREIGN PATENT DOCUMENTS

EP    J961 263    * 12/1999

* cited by examiner

*Primary Examiner*—Daniel Abebe
(74) *Attorney, Agent, or Firm*—Akerman Senterfitt

(57) ABSTRACT

A method and system for completing user input in a speech recognition system. The method can include a series of steps which can include receiving a user input. The user input can specify an attribute of a selection. The method can include comparing the user input with a set of selections in the speech recognition system. Also, the method can include limiting the set of selections to an available set of selections which can correspond to the received user input. The step of matching a received user spoken utterance with the selection in the available set of selections also can be included.

12 Claims, 3 Drawing Sheets

METHOD, SYSTEM, AND APPARATUS FOR LIMITING AVAILABLE SELECTIONS IN A SPEECH RECOGNITION SYSTEM

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of speech recognition software, and more particularly, to speech recognition software as implemented on handheld or other mobile devices.

2. Description of the Related Art

Speech recognition is the process by which an acoustic signal received by microphone is converted to a set of text words, numbers, or symbols by a computer. These recognized words may then be used in a variety of computer software applications for purposes such as document preparation, data entry, and command and control. Improvements to speech recognition systems provide an important way to enhance user productivity.

Mobile computing and communications devices, such as personal digital assistants (PDAs) and cellular telephones, have become common tools for performing data management functions, as well as for communicating among multiple users. The portability of such devices and the ability to exchange data among users provides users with added benefits further enhancing user productivity. Additionally, mobile devices can provide users with access to information and services available from computer communications networks.

Notably, the mobile aspect of mobile devices can be a disadvantage regarding data entry. Users are forced to interact with the small visual display of the mobile device. Although such devices can include handwriting recognition applications for data entry, the convenience of a full size keyboard is often lacking. In cases where a keyboard can be attached to a mobile device, the combination of the mobile device and the keyboard, effectively, is no longer mobile. Thus, to use a mobile device while "on the go", users can be limited to using a stylus as an input device or manipulating physical buttons on the mobile device.

Speech recognition technology can provide an effective method of data entry with regard to mobile devices. For example, a speech recognition system (SRS) can function as a front end user interface to the mobile device or to an application within the mobile device. A SRS can provide the user with several benefits including a hands-free method of data entry. Additionally, a SRS solution for data entry does not immobilize the mobile device by appending unwieldy peripheral devices to it, as is the case with portable keyboards.

Still, SRSs typically require significant system resources to function properly. Accordingly, when SRSs are implemented on mobile computing and communications devices, the limited processing power of such devices can limit the number of speech recognition functions available to a user. For example, after acoustically processing a user spoken utterance, a speech recognition system within a more powerful computer system can compare the proposed result to thousands of possible word models to determine a match. The time required to search the thousands of possible word models can be de minimis. However, such searches can require significantly more time when performed with the limited computing resources of mobile devices. Thus, for efficient operation in a mobile computing environment, a speech recognition application can contain a limited vocabulary or number of recognizable user spoken phrases. For example, if the SRS can typically recognize 10,000 possible word selections, a SRS implementation on a mobile device can limit the possible word selections to only 250. In this manner, the speech recognition application can conserve system resources for increased speed in converting user utterances to text input or system commands. However, this solution can prevent a user from realizing the complete functionality available from a SRS. Specifically, words needed by the user may simply be left out of the SRS vocabulary in an effort to conserve system resources during operation of the SRS. Moreover, with limited selections being available from the SRS, the complete functionality of an application or the mobile device's operating system may not be accessible to the user. Though speech recognition technology can be beneficial to mobile computing and communications device users, still, the aforementioned limitations of using speech recognition technology with such devices have not been fully addressed.

SUMMARY OF THE INVENTION

The invention provides a method and a system for completing a user input using speech recognition technology. The invention concerns the implementation of a speech recognition systems (SRS) in a mobile computing or communications device (mobile device). The invention can receive one or more user inputs, each specifying an attribute which can be a text word or phrase or one or more characters of a user desired text string selection. Based on the received attributes, the SRS can limit the number of available text string selections from which the SRS can choose when matching a subsequent user spoken utterance.

The inventive method taught herein can begin by (a) receiving a user input where the user input can specify an attribute of a selection. The attribute can specify one or more characters or a text word or phrase. The method can include the steps of (b) comparing the user input with a set of selections in the speech recognition system, and (c) limiting the set of selections to an available set of selections which correspond to the received user input. Steps (a), (b), and (c) can be performed repetitively until the available set of selections is consistent with predetermined selection criteria. The step of matching a received user spoken utterance with the selection in the available set of selections also can be included. Further, the method can include notifying a user when the available set of selections is consistent with the predetermined selection criteria.

Another embodiment of the invention can be a method of completing user input including the steps of: (a) receiving a user input where the user input can specify an attribute of a selection; (b) comparing the user input with a set of selections in the speech recognition system; and (c) limiting the set of selections to an available set of selections which correspond to the received user input. The step of repetitively performing the steps (a), (b), and (c) until the available set of selections is consistent with predetermined selection criteria can be included. Also, the method can include notifying a user when the available set of selections is consistent with predetermined selection criteria, and matching a received user spoken utterance with the selection in the available set of selections.

A second aspect of the invention can be a system for completing user input including a buffer for receiving one or more user inputs and one or more user spoken utterances. A set of selections for comparing the user spoken utterance can be included. Additionally, a limiter for filtering the set of selections to an available set of selections based upon the user inputs can be included. Each user input can specify an attribute of a selection within the available set of selections. The attributes can specify one or more characters or text words or phrases. Also, a speech recognition engine for processing the user spoken utterances can be included.

A third aspect of the invention can be a machine readable storage, having stored thereon a computer program having a plurality of code sections executable by a machine for causing the machine to perform a series of steps. The steps can include receiving a user input which can specify an attribute of a selection. The attribute can specify one or more characters or a text word or phrase. The step of comparing the user input with a set of selections in a speech recognition system can be included. Also, the step of limiting the set of selections to an available set of selections which correspond to the received user input can be included. The machine readable storage can cause the machine to perform the aforementioned steps of receiving a user input, comparing the user input, and limiting the set of selections repetitively until the available set of selections is consistent with predetermined selection criteria. The additional step of matching a received user spoken utterance with the selection in the available set of selections can be included. The machine readable storage can cause the machine to perform the additional step of notifying a user when the available set of selections is consistent with predetermined selection criteria.

BRIEF DESCRIPTION OF THE DRAWINGS

There are shown in the drawings embodiments which are preferred, it being understood, however, that the invention is not so limited to the precise arrangements and instrumentalities shown, wherein.

DETAILED DESCRIPTION OF THE INVENTION

Figure 1:
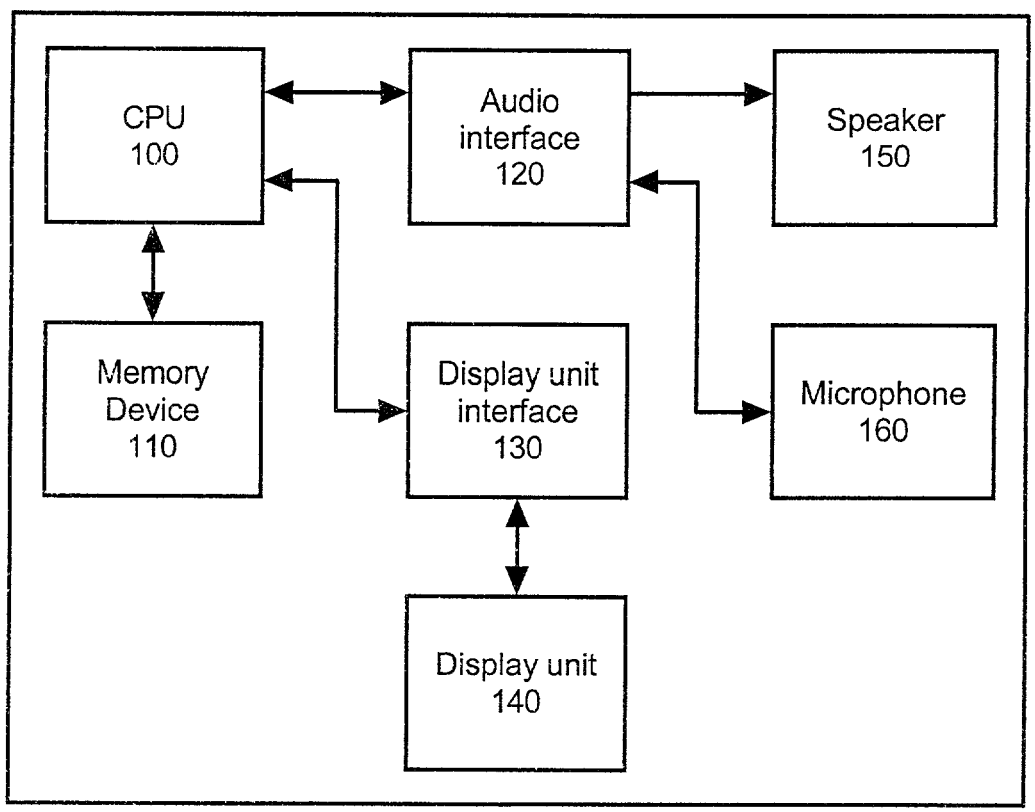
FIG. 1 is a block diagram illustrating an exemplary computer system configuration for performing speech recognition.

The invention provides a method and a system for completing a user input using speech recognition technology. The invention combines speech recognition technology and differing methods of text input to enable a user to filter a large list of selections to a manageable set of available selections. The invention concerns the implementation of a speech recognition system (SRS) in a mobile computing or communications device (mobile device). For example, the SRS can provide the user interface to the operating system of a mobile device. Alternatively, the SRS can provide a user interface to an application within the mobile device or an application accessible through a communications link over a computer communications network.

The invention can receive user input to limit the number of available selections from which a SRS can choose when matching the available selections to a subsequent user spoken utterance. As mentioned, the invention can receive a user input, where the user input can specify text to the SRS. The user input can be in the form of a user spoken utterance, a pointer manipulation, or a user keyboard entry. For example, in the case of a user spoken utterance, the SRS can convert the user spoken utterance to text. In the case of a pointer manipulation, a user can point to a graphical representation of an alphanumeric keyboard on the mobile device display screen using a finger or other pointing device to specify text which can be provided to the SRS. Alternatively, the user can use a stylus or other pointing device to write on the mobile device display screen. The user's handwriting can be converted to text using handwriting recognition software. The resulting text can be provided to the SRS. Finally, in the case of a computer keyboard entry, the user can type a key on the keyboard so that the resulting text can be provided to the SRS.

The text specified to the SRS by the user input can be an attribute of a text string recognizable by the SRS. The attribute can be a text word or phrase or one or more alphanumeric characters. If the attribute is a character, the character can be the first character of a word, phrase, or text string recognizable by the SRS. For example, if the user accesses a map application in the mobile device, the user can look up a street named "Poinciana" in Miami. Miami, however, can have thousands of street name entries within the SRS vocabulary, too many for a mobile device to quickly search. Thus, the user input can specify the letter "P" to the SRS. The SRS can compare the received text to a set of selections in the SRS. Notably, the selections can be the words, phrases, or text strings which the SRS is capable of recognizing.

The SRS can limit the set of selections to an available set of selections. The set of selections can be filtered such that only selections containing the user specified text are available selections in the SRS for matching user spoken utterances. For example, if the SRS received "P" as input text, then the SRS can filter the word selections in the SRS such that only words beginning with "P" can be available to the SRS as selections. Taking the previous example, the number of available selections beginning with "P" can be significantly smaller than the entire vocabulary which would be searched without filtering.

In the case where the attribute is a text word or phrase, the attribute can provide information to the SRS about a subsequent text string or phrase to be uttered by the user and recognized by the SRS. For example, if the user is in need of directions to a restaurant, the user can specify attributes which describe the restaurant to the SRS. Similar to the street example above, a state or city can contain too many restaurants for a mobile device to quickly search. Thus, the user input can specify the city location "Miami", a style of cuisine, "Chinese", and then the restaurant name "House of Noodles". In this case, the SRS can compare the restaurant name "House of Noodles" to a limited set of restaurant names in the SRS having the attributes of "Miami" and "Chinese".

Notably, the aforementioned steps can be performed repetitively until the number of available selections can be managed by the processing capabilities of the particular mobile device utilized. For example, if after receiving a single character the number of available selections is too large for the mobile device to quickly search, the system can receive a second user input specifying another character.

Taking the previous example, the system can receive "O" for "Poinciana". In that case the SRS can limit the available selections to words beginning with "PO". The system can continue in this manner until the number of available selections can be efficiently searched. When the number of available selections becomes small enough, the SRS can provide notification to the user.

Once the user receives notification from the SRS, the user can utter the desired word or phrase into the mobile device. Because the number of available selections has been decreased to a manageable number, the SRS can convert the user specified utterance to text without a lengthy and time consuming search. Notably, the number of selections initially available to the user can be significantly larger than the number which the mobile device can quickly and efficiently search. Thus, much of the speech recognition capability of the SRS can be included within a mobile device implementation.

FIG. 1 is a block diagram illustrating an exemplary computer system configuration for performing speech recognition. The block diagram illustrates a computer system 90 for use in conjunction with the present invention. Computer system 90 can be realized as a mobile computing device. The system is preferably comprised of a central processing unit 100 (CPU), one or more memory devices 110 and associated circuitry. The system also includes a microphone 160 operatively connected to the computer system through suitable audio interface circuitry or "sound board" 120. Computer system 90 can include at least one display unit 140 such as a video data terminal (VDT), a liquid crystal display, or other touch sensitive display operatively connected through a display unit interface 130. The CPU can be comprised of any suitable microprocessor or other electronic processing unit, as is well known to those skilled in the art. An example of such a CPU can include the Mobile Pentium III or Mobile Celeron brand microprocessor available from Intel Corporation or any similar microprocessor suited to mobile applications. Speaker 150, as well as a pointing device, such as a stylus, may be provided with the system, but are not necessary for operation of the invention as described herein. Further, it should be appreciated that the computer system can contain additional data entry buttons or keys for navigation of the operating system, navigation among and within applications, as well as for command and control and data entry. For example, the computer system can include one or more buttons, a scroll key, or a jog-shuffle wheel.

The various hardware requirements for the computer system as described herein can generally be satisfied by any one of many commercially available mobile computing devices, such as the WorkPad C3 offered by manufacturers such as International Business Machines Corporation. Notably, some components of the aforementioned computer system, such as the speaker 150, the audio interface 120, and the microphone 160, can be hardware add-ons to the original mobile computing device.

Figure 2:
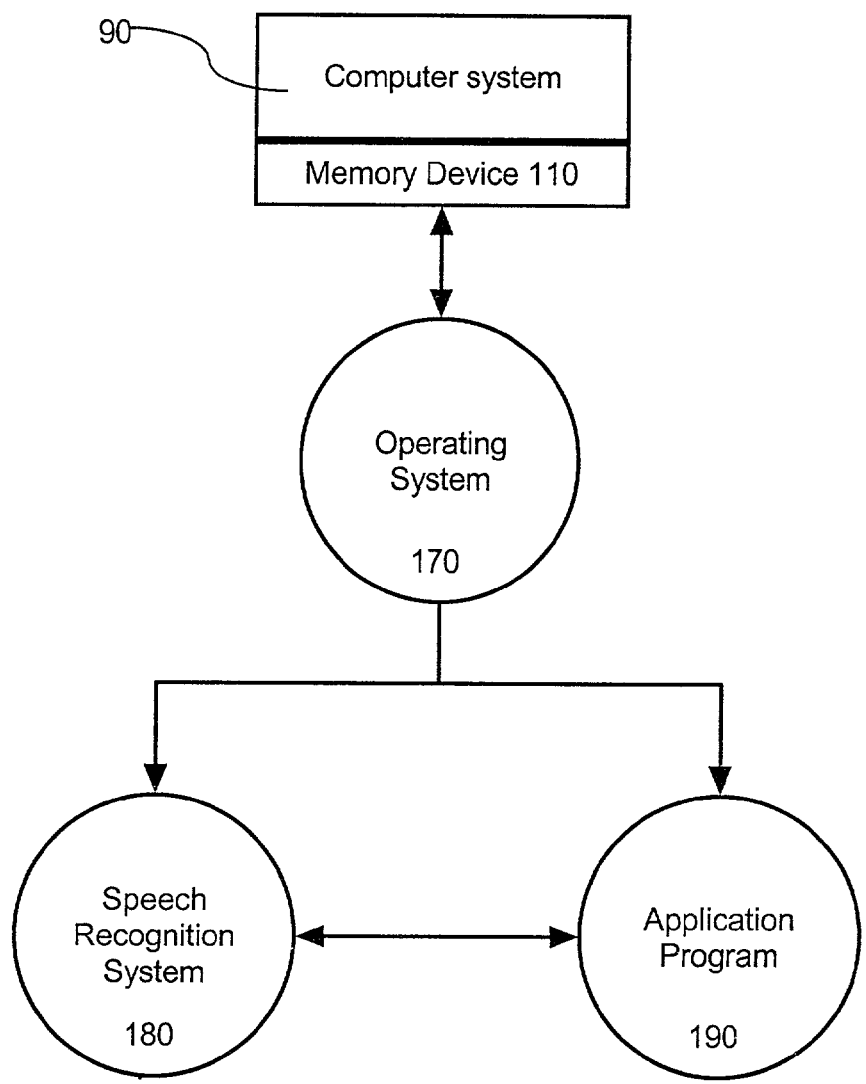
FIG. 2 is a block diagram illustrating a high level architecture for the computer system in FIG. 1.

FIG. 2 is a block diagram illustrating a high level architecture for the computer system 90 of FIG. 1. As shown in FIG. 2, computer system 90 includes computer memory device 110, which can be an electronic random access memory. Memory device 110 further can include a bulk data storage medium, such as a magnetic disk. One such magnetic disk drive suitable for use with a mobile device can be the Microdrive™ available from International Business Machines Corporation. Computer memory device 110 can further include one or more cache memories.

Memory device 110 can contain an operating system 170, a speech recognition system 180, and an application program 190. In FIG. 2, the operating system 170, SRS 180, and application program 190 are shown as separate programs. Notably, the invention is not limited in this regard, and these programs can be implemented as a single, more complex program. For example the SRS 170 can be combined with operating system 170. Alternatively, SRS 170 can be combined with application program 190. Additionally, the invention can be realized in hardware, software, or a combination of hardware and software. For example, the invention can be implemented as a microchip designed and manufactured to perform the method of the invention.

Operating system 170 can be one of the Windows family of operating systems for portable devices, such as Windows CE which is available from Microsoft Corporation of Redmond, Wash. However, the system is not limited in this regard, and the invention can also be used with any other type of computer operating system, such as the Palm Operating System available from Palm Computing, Inc. The system as disclosed herein can be implemented by a programmer, using commercially available development tools for the operating systems described above.

Audio signals representative of sound received in microphone 160 are processed within computer 90 using conventional computer audio circuitry so as to be made available to the operating system 170 in digitized form. The audio signals received by the computer are conventionally provided to the SRS 180 via the computer operating system 170 in order to perform speech recognition functions. As in conventional speech recognition systems, the audio signals are processed by a speech recognition engine included within the SRS 180 to identify words spoken by a user into microphone 160.

The SRS 180 receives a digitized speech signal from the operating system. The signal is subsequently transformed into a useful set of data by sampling the signal at some fixed rate, typically every 10–20 msec. A new representation of the audio signal can be produced which can then be used in subsequent stages of the voice recognition process to determine the probability that the portion of waveform just analyzed corresponds to a particular phonetic event. This process is intended to emphasize perceptually important speaker independent features of the speech signals received from the operating system. Algorithms process the speech signals further to adapt speaker-independent acoustic models to those of the current speaker. Finally, search algorithms are used to guide the SRS to the most likely words corresponding to the speech signal. The search process occurs with the help of acoustic models, lexical models, and language models.

Figure 3:
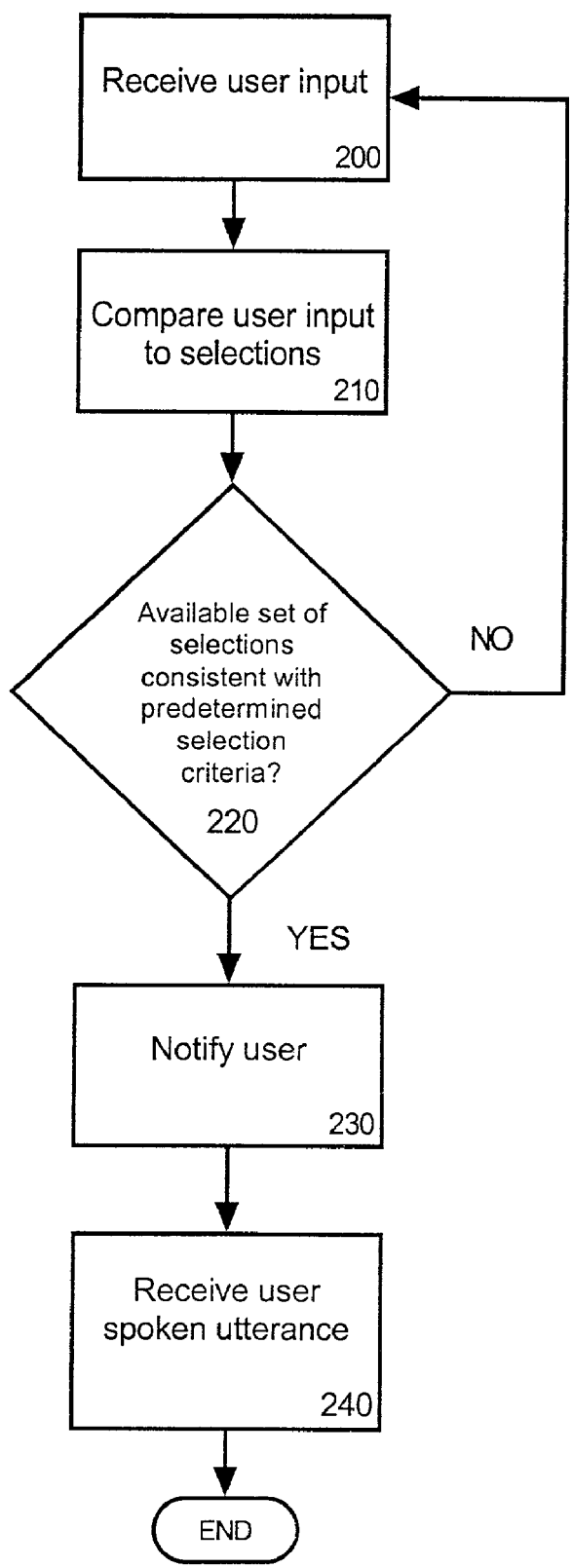
FIG. 3 is a flow chart illustrating a process for completing a user input in a speech recognition system.

FIG. 3 is a flow chart illustrating a process for completing a user input in a speech recognition system as performed by SRS 180 of FIG. 2. The method of the invention begins in step 200 where the SRS is in an active state awaiting user input. In step 200, the SRS can receive a user input via the operating system of the mobile device. For example, the user input can be a pointer action, a keyboard entry, or a user utterance, each of which can represent a character. Regardless of the type of user input received, the input represents an attribute for providing information corresponding to a text string recognizable by the SRS. The attribute can be converted to one or more text characters or a text word or phrase and provided to the SRS. Notably, if the attribute is a character, the character can be any character beginning a text string, word, or phrase existing in the SRS vocabulary, and therefore, recognizable by the SRS. If the attribute is a text word or phrase, the text word or phrase can be any text word or phrase providing the SRS with additional information corresponding to a text string, word, or phrase existing in the SRS vocabulary. After receiving a user input corresponding to a character, the SRS can continue to step 210.

In step 210, the SRS can compare the received attribute specified by the user input with the set of selections contained in the SRS. Notably, the set of selections can be the vocabulary of the SRS which contains all recognizable text of the SRS. If the attribute is a character, the SRS can limit the available selections within the SRS to only those beginning with the user specified character. For example, the SRS can contain a set of selections or vocabulary of 10,000 text strings. If the user input specified the letter "P", the SRS receives a letter "P" from the operating system. In that case, the SRS limits the set of selections to only those beginning with the letter "P". Thus, the available set of selections contains only those selections beginning with the letter "P".

In the case where the attribute is a text word or phrase, the SRS can compare the received attribute with the set of selections contained in the SRS. The SRS can limit the available selections within the SRS to only those having attributes which correspond to the user specified attribute. For example, in the case of a map application, locations can be stored and can be recognizable by the SRS. The location can be associated with attributes such as restaurant, city, style of cuisine, price range and any other suitable criteria for specifying a location. Thus, a user can specify a location by providing attributes to the SRS. For example, the user can provide the SRS with the attribute "restaurant". The SRS can limit the set of selections to only those which are restaurants. The limiting process can continue with each additional attribute supplied by the user. If the user then provides the SRS with the attribute "Chinese", then the SRS further can limit the available set of selections to Chinese restaurants. After completion of step 210, the SRS continues with step 220.

In step 220, the SRS determines whether the available set of selections is consistent with predetermined selection criteria. The selection criteria can be a threshold value for comparing the number of available selections. For example, the threshold value can be predetermined and vary among differing mobile devices based on the device's processing power. Consequently, more powerful mobile devices can process a larger set of available selections to find an acoustic match to a user utterance than less powerful devices. Thus, the threshold value can represent the maximum number of available selections which the mobile device can search without forcing the user to wait an excessively long period of time. Additionally, the threshold value can be a user programmable value. In that case the user can increase or decrease the threshold value to maximize the SRS's efficiency and minimize the processing time according to user preferences. Regardless of how the threshold value is calculated, the SRS can determine the number of available selections after receiving a user input specifying an attribute. If the number of available selections is greater than the threshold, the SRS can query the user for a second attribute such as the second character of the user desired text string or another text word or phrase describing the user desired selection to the SRS. Thus, the steps of 200 through 220 can be performed repetitively until the number of available selections is less than or equal to the predetermined threshold value. If the number of available selections is greater than the threshold value, the SRS loops back to step 200. If the number of available selections is less than or equal to the threshold value, then the number of available sections is consistent with the predetermined selection criteria and the SRS continues to step 230.

In step 230, the SRS has limited the number of available selections consistent with predetermined selection criteria. Accordingly, the SRS can notify the user that the user can utter the user desired phrase, word, or text string into the mobile device for conversion to text. Notably, the SRS can notify the user using the mobile device input/output mechanisms. The user notification can be accomplished in any of a variety of ways including, but not limited to, a visual prompt, an audible prompt, or another physical prompt such as a vibration of the mobile device. After notifying the user, the SRS can continue to step 240.

In step 240, the SRS can receive a user spoken utterance for conversion to text. The received user spoken utterance can be compared against the available set of selections for determining the textual representation of the user spoken utterance. Notably, once the user spoken utterance is converted to text, the SRS can provide the result to other applications or the mobile device operating system for processing. Further, the result can be provided to a computer communications network for performing the user specified operation or accessing information available from the computer communications network.

The present invention can be realized in hardware, software, or a combination of hardware and software. A method and system for completing user input in a SRS according to the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which when loaded in a computer system is able to carry out these methods.

Computer program means or computer program in the present context means any expression, in any language, code or notation, of a set of instructions intended to cause a system having an information processing capability to perform a particular function either directly or after either or both of the following a) conversion to another language, code or notation; b) reproduction in a different material form.

The invention claimed is:

1. In a speech recognition system disposed within a portable computing device, a method of completing user input comprising:
  (a) receiving a user input, said user input specifying at least one character corresponding to at least one recognizable word selection of said speech recognition system of said portable computing device;
  (b) comparing said user input with a set of selections in said speech recognition system;
  (c) comparing the set of selections against a threshold value representing a maximum number of selections that the portable computing device is able to process within a desired period of time;
  when the set of selections exceeds the threshold value, prompting for additional user input and performing steps (a), (b), and (c) using additional input received responsive to the prompting step;

when the set of selections favorably compares with the threshold value, limiting said set of selections to an available set of selections which correspond to said specified at least one character;

receiving a user spoken utterance; and, matching said received user spoken utterance wit a selection in said available set of selections.

2. The method of claim 1, further comprising:

notifying a user when said available set of selections is consistent with predetermined selection criteria using at least one of an audio prompt and a physical prompt of vibrating the portable computing device.

3. The method of claim 1, wherein said at least one character specifies a text word or phrase.

4. The method of claim 1, wherein said threshold value is based upon the processing power of the portable computing device.

5. The method of claim 1, wherein said threshold value is a user programmable value.

6. In a speech recognition system disposed within a portable computing device, a method of completing user input comprising:

(a) receiving a user input said user input specifying at least one character corresponding to at least one recognizable word selection of said speech recognition system of said portable computing device;

(b) comparing said user input with a set of selections in said speech recognition system;

(c) comparing the set of selections against a threshold value representing a maximum number of selections that the portable computing device is able to process within a desired period of time;

repetitively performing steps (a), (b), and (c) until the set of selections favorably compares with the threshold value;

when the set of selections favorably compares with the threshold value, limiting said set of selections to an available set of selections which correspond to said received user input;

when the set of selections favorably compares with the threshold value, notifying a user;

responsive to said notifying step, configuring said portable user device to receive a user spoken utterance that is to be speech recognized using the available set of selections;

subsequent to said configuring step, receiving a user spoken utterance; and, matching said received user spoken utterance with a selection in said available set of selections.

7. A system disposed within a portable computing device for completing user input comprising:

a buffer for receiving one or more user inputs and one or more user spoken utterances;

a set of recognizable word selections for comparing with said user spoken utterance;

a threshold value representing a maximum number of selections that the portable computing device is able to process within a desired period of time, wherein spoken utterances are speech recognized by said portable computing device only when the set of recognizable word selections favorably compares to the threshold value;

a limiter for filtering said set of recognizable word selections to an available set of recognizable word selections based upon said user inputs, each said user input specifying at least one character corresponding to at least one recognizable word selection of a speech recognition system of said portable computing device; and, a speech recognition engine for processing said user spoken utterances to match a received user spoken utterance with only said available set of recognizable word selections.

8. The system of claim 7, wherein said at least one character specifies a text word or phrase.

9. A machine readable storage, having stored thereon a computer program having a plurality of code sections executable by a machine for causing the machine to perform the steps of:

(a) receiving a user input, said user input specifying at least one character corresponding to at least one recognizable word selection of a speech recognition system disposed within a portable computing device;

(b) comparing said user input with a set of selections in said speech recognition system;

(c) comparing the sot of selections against a threshold value representing a maximum number of selections that the portable computing device is able to process within a desired period of time;

when the set of selections favorably compares with the threshold value, limiting said set of selections to an available set of selections which correspond to said specified at least one character;

receiving a user spoken utterance; and, matching said received user spoken utterance with a selection in said available set of selections.

10. The machine readable storage of claim 9, further causing said machine to perform the steps of:

prompting for additional user input; and performing steps (a), (b), and (c) using additional input received responsive to the prompting step, wherein said prompting and performing steps are executed when the set of selections exceeds the threshold value.

11. The machine readable storage of claim 9, further comprising:

notifying a user when said available set of selections is consistent with predetermined selection criteria using at least one of an audio prompt and a physical prompt of vibrating the portable computing device.

12. The machine readable storage of claim 9, wherein said at least one character specifies a text word or phrase.

* * * * *